US008495072B1

(12) United States Patent
Kapoor et al.

(10) Patent No.: US 8,495,072 B1
(45) Date of Patent: Jul. 23, 2013

(54) ATTRIBUTE-BASED IDENTIFICATION SCHEMES FOR OBJECTS IN INTERNET OF THINGS

(75) Inventors: Shalini Kapoor, Bangalore (IN); Shachi Sharma, Delhi (IN); Bharat Ramakrishnan Srinivasan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/359,900

(22) Filed: Jan. 27, 2012

(51) Int. Cl.
*G06F 17/30* (2006.01)
(52) U.S. Cl.
USPC .......................................................... 707/754
(58) Field of Classification Search
USPC .............................................................. 707/754
See application file for complete search history.

(56) References Cited

U.S. PATENT DOCUMENTS

| | | | |
|---|---|---|---|
| 7,835,319 B2 | 11/2010 | Sugar | |
| 7,965,173 B2 | 6/2011 | Huther | |
| 8,004,407 B2 | 8/2011 | Trosper | |
| 2002/0030587 A1 | 3/2002 | Jackson | |
| 2006/0005126 A1* | 1/2006 | Shapiro | 715/522 |
| 2007/0262851 A1 | 11/2007 | Stewart et al. | |
| 2011/0289084 A1* | 11/2011 | Fisher | 707/737 |

FOREIGN PATENT DOCUMENTS

EP  1742170  10/2007

OTHER PUBLICATIONS

Quack, T. et al., "Object Recognition for the Internet of Things", Internet of Things Conference, Mar. 26-28, 2008, Zurich, Lecture Notes in Computer Science, vol. 4952, pp. 230-246, Springer-Verlag Berlin Heidelberg 2008.
"ITU Internet. Reports 2005: The Internet of Things—Executive Summary", Nov. 2005, International Telecommunication Union, prepared for the World Summit on the Information Society, Nov. 16-18, 2005. Tunis, International Telecommunication Union (ITU), Geneva, Switzerland.
Shannon, C. E., "A Mathematical Theory of Communication", The Bell System Technical Journal, Jul. 1948, 55 pages, vol. 27, Murray Hill, New Jersey, USA.
Huffman, D.A. "A Method for the Construction of Minimum-Redundancy Codes", Proceedings of the I.R.E., Sep. 1952, pp. 1098-1102, Massachusetts Institute of Technology, Cambridge, Massachusetts, USA.

* cited by examiner

*Primary Examiner* — Baoquoc N To
(74) *Attorney, Agent, or Firm* — Ference & Associates LLC

(57) ABSTRACT

Methods and arrangements for object identification. An identification request is received from different objects of a network. Attributes and values of each object are ascertained, and at least one attribute-value pair from each object is filtered out. An ID is generated for each object based on at least one remaining attribute-value pair from the filtering.

21 Claims, 7 Drawing Sheets

```
Input: A, H, LB, UB, R
Output: F_A
i = 0;
while (i < |A|) do
    if (LB < H(a_i) < UB) OR (a_i meets R) then
        insert a_i into F_A;
        i++;
    else
        i++;
        continue;
```

ATTRIBUTE-BASED IDENTIFICATION SCHEMES FOR OBJECTS IN INTERNET OF THINGS

BACKGROUND

Increasingly, objects are being connected electronically and/or communicatively in ways that previously were the province mostly of computers. As such, the term "Internet of Things" (IoT) has come to describe a dynamic network of globally connected things, entities, devices, items or objects. An illustrative and non-restrictive example can involve a company or enterprise in which numerous items are communicatively interconnected such as computers, mobile devices (e.g., phones, laptops or tablets), lighting and climate control systems, cars or other vehicles and "smart" appliances (e.g., refrigerators, televisions) and some or all can be controlled or interacted with from one place or another. Other examples involve systems that are distributed over disparate geographical areas as opposed to just one physical location. As the number and complexity of interconnected items in an IoT has the potential to grow considerably, the tracking, monitoring and identification of each interconnected item becomes all the more challenging.

BRIEF SUMMARY

In summary, one aspect of the invention provides a method comprising: receiving an identification request from different objects of a network; ascertaining attributes and values of each object; filtering out at least one attribute-value pair from each object; and generating an ID for each object based on at least one remaining attribute-value pair from the filtering.

Another aspect of the invention provides an apparatus comprising: at least one processor; and a computer readable storage medium having computer readable program code embodied therewith and executable by the at least one processor, the computer readable program code comprising: computer readable program code configured to receive an identification request from different objects of a network; computer readable program code configured to ascertain attributes and values of each object; computer readable program code configured to filter out at least one attribute-value pair from each object; and computer readable program code configured to generate an ID for each object based on at least one remaining attribute-value pair from the filtering.

An additional aspect of the invention provides a computer program product comprising: a computer readable storage medium having computer readable program code embodied therewith, the computer readable program code comprising: computer readable program code configured to receive an identification request from different objects of a network; computer readable program code configured to ascertain attributes and values of each object; computer readable program code configured to filter out at least one attribute-value pair from each object; and computer readable program code configured to generate an ID for each object based on at least one remaining attribute-value pair from the filtering.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 sets forth a filtering algorithm.

DETAILED DESCRIPTION

Figure 1:
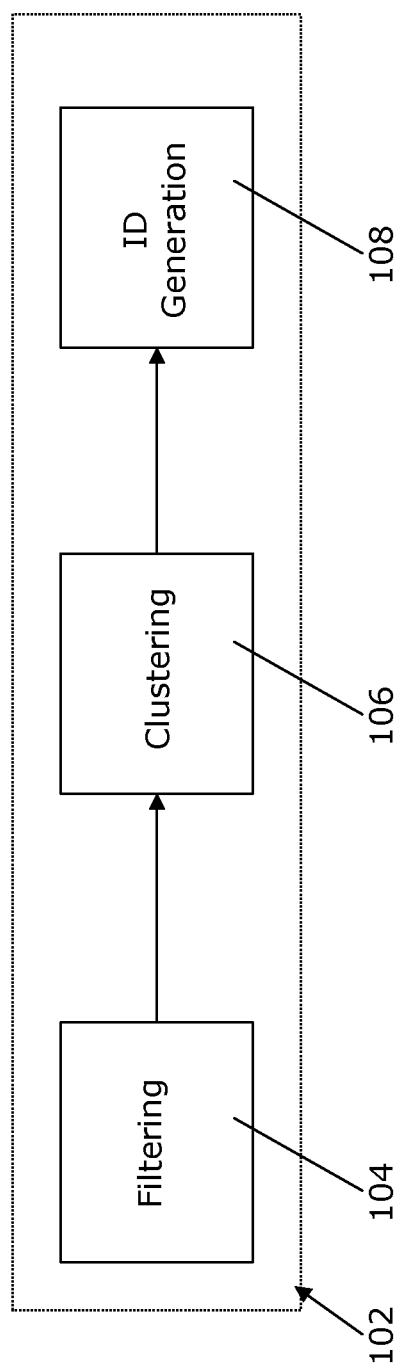
FIG. 1 schematically illustrates an ID generator.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-5. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Figure 3:
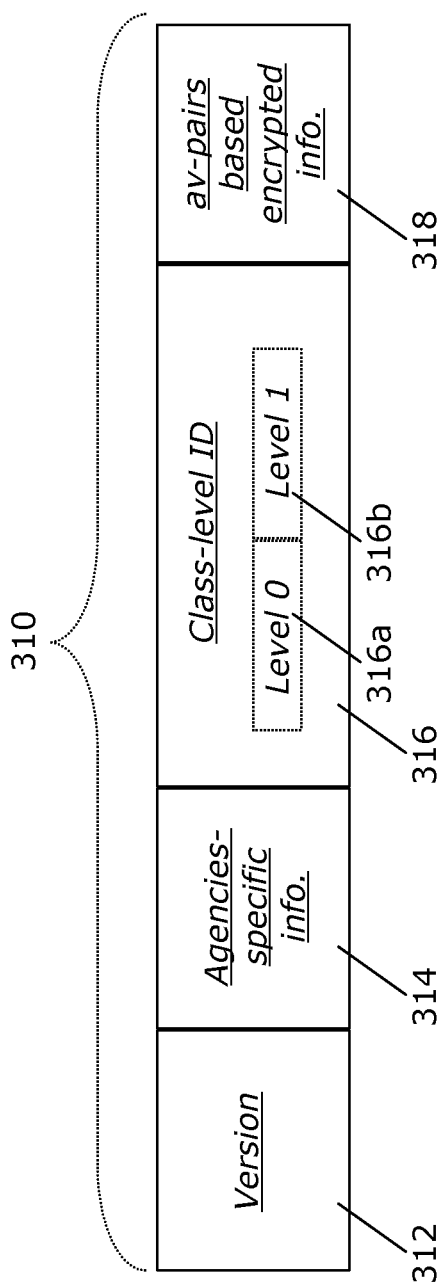
FIG. 3 schematically generates an ID structure.
Figure 4:
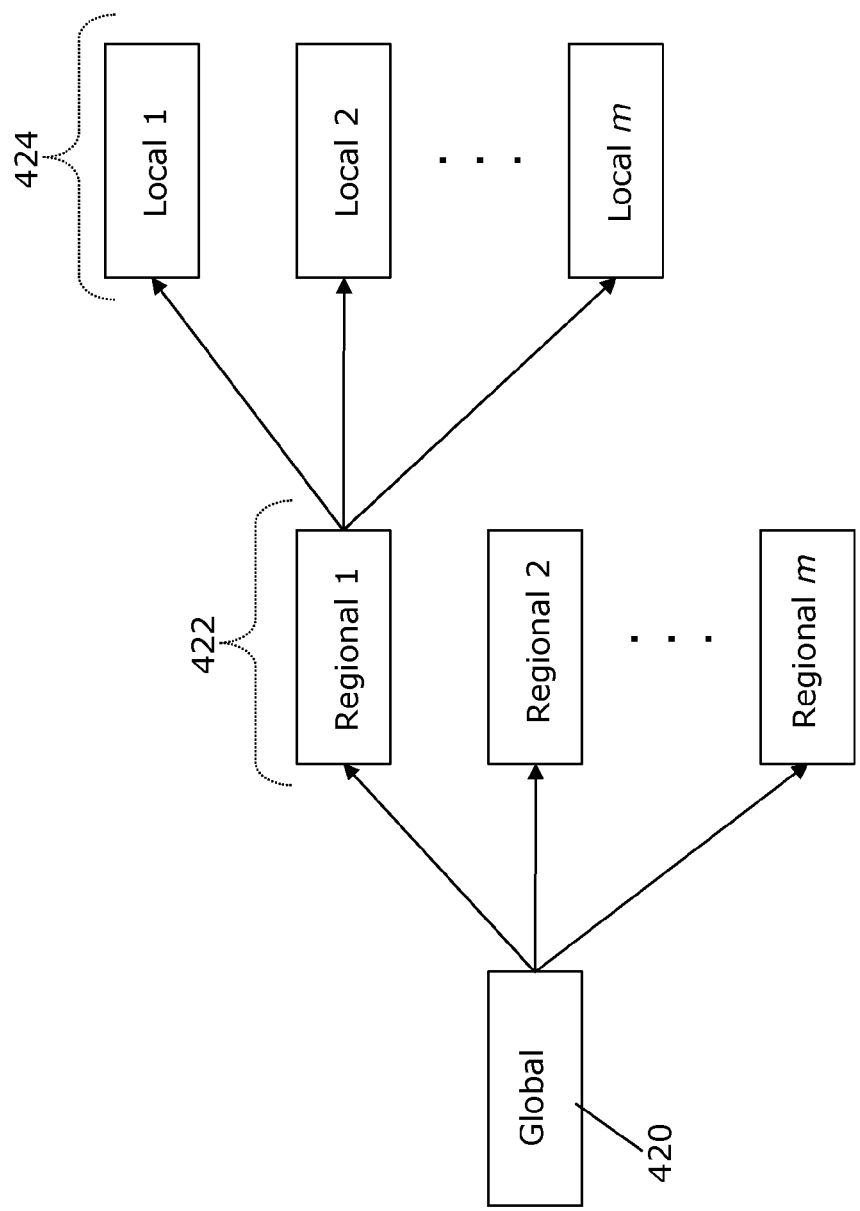
FIG. 4 schematically illustrates a global management hierarchy.
Figure 5:
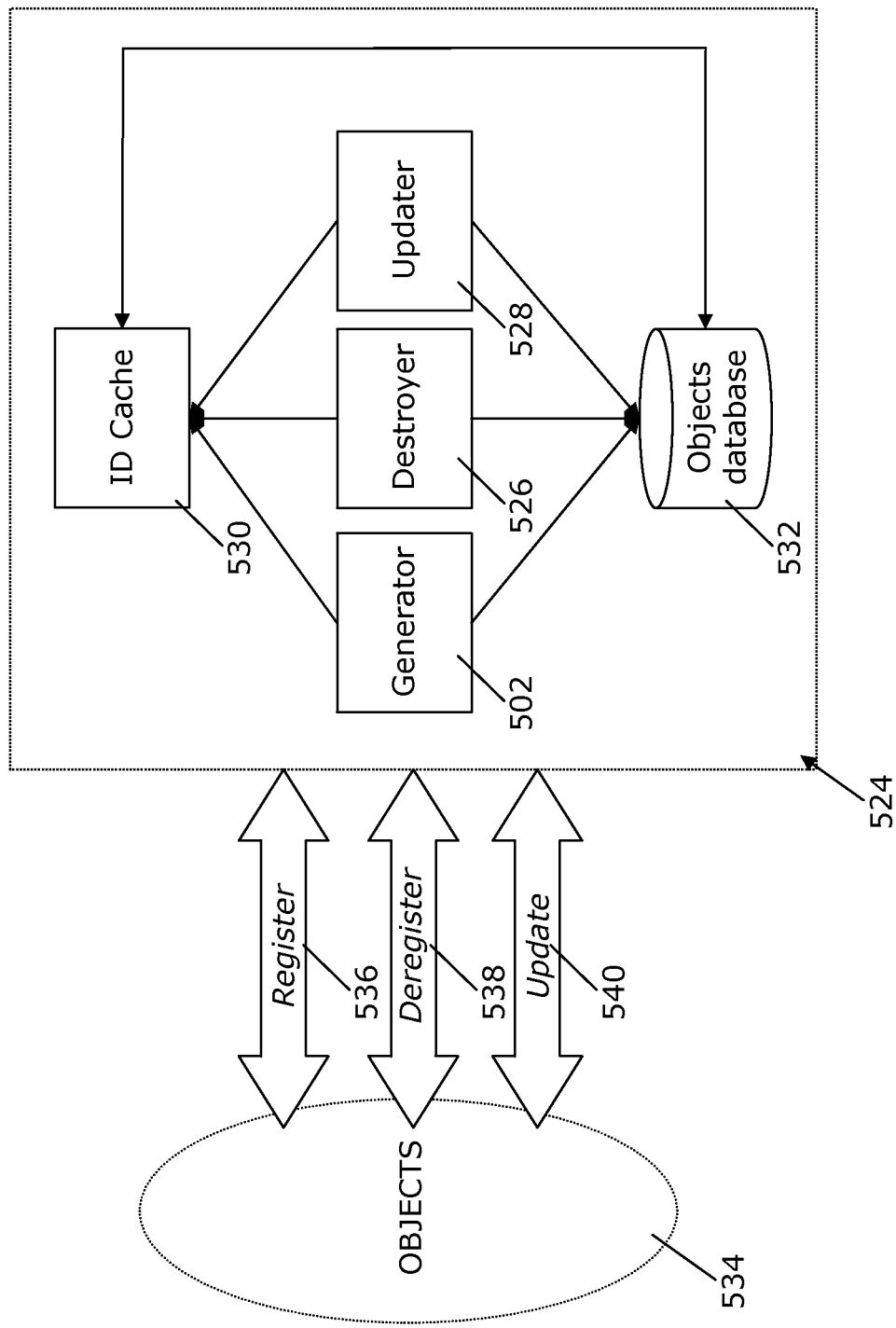
FIG. 5 schematically illustrates a system architecture.

To facilitate easier reference, in advancing from FIG. 1 to and through FIG. 5, a reference numeral is advanced by a multiple of 100 in indicating a substantially similar or analogous component or element with respect to at least one component or element found in at least one earlier figure among FIGS. 1-5.

Generally, many devices have long been presumed to be heterogeneous with respect to each other, such as desktop devices, mobile communicators, digital assistants, wrist watches, game consoles, clothing, consumer electronics (e.g., TVs, radios, and refrigerators), cars, sensors, smart meters, and video surveillance equipment, to name but a few examples. However, advancements in the realm of networking, sensors, actuators, radio frequency identification (RFID) and near field communication (NFC) technologies have made it possible to connect various devices and real-world objects and or virtual objects. Smart applications, as they have evolved, have increasingly demanded that heterogeneous devices be in a position to discover, identify and communicate with each other so as to able to exchange data and cooperate to undertake predetermined tasks. However, a reliable, standardized scheme for permitting the identification of heterogeneous devices per se and with respect to each other has long been elusive.

In logistics and asset management, an object is often identified by an RFID tag, while a separate database (usually resident at an RFID manufacturer domain) contains details which map tags to objects. As such, an RFID reader typically reads a tag and then derives from the tag the location of the associated object. The reader then contacts the manufacturer database to fetch the details of the object. Accordingly, if the RFID tag on an object is faulty in any way or possibly has been destroyed, then object details cannot be obtained. Further, if a faulty RFID tag is replaced by a new RFID tag, then the manufacturer database (the existing one, or even a new one corresponding to a new manufacturer) needs to be updated. It can be appreciated that a process such as this can be inordinately time-consuming and complex.

Another challenge often encountered is that devices tend to be identifiable solely by hardware identifiers assigned by a manufacturer. Thus, not only might such identifiers be difficult to assimilate in a network outside of the context of a manufacturer's own network, but they might be private or proprietary identifiers and may present a compromise in security to the manufacturer if revealed to other entities. Accordingly, hardware-dependent identifiers do not lend themselves to a flexible, integrable identification scheme that would allow ready communication with and among objects deriving from different manufacturers.

Conventionally, devices are identified by manufacturer-assigned hardware identifiers, and security concerns tend to preclude making such hardware public. Consequently, difficulties are presented in discovering devices and enabling communication between heterogeneous devices. For instance, multiple identification schemes might be in play (with various types of commercially known identifiers such as EPC, uID, ID@URI, Zigbee, GUID, etc.), making integrative identification across devices and types of devices difficult if not impossible.

In accordance with at least one embodiment of the invention, there is broadly contemplated herein an identification scheme which is independent of existing schemes and can serve to unite and coordinate disparate schemes. Particularly, an attribute-based scheme, variously referred to herein as "GenID" (Generated ID), is contemplated for objects in the domain of the Internet of Things.

As such, in accordance with at least one embodiment of the invention, GenID generates logical identifiers for objects, from hardware-independent information, in a way that embeds meaningful information about objects. Also broadly contemplated herein is an identity management system (IMS) for objects, wherein the GenID scheme is implemented.

In approaching an identification scheme in accordance with at least one embodiment of the invention, it is recognized that a device may already have several identifiers associated with it, such as (by way of illustrative example): manufacturer ID, network address, temporary local ID (as may be the case in adhoc networks), ID's of sensors or actuators, and/or possibly many others. Thus, solutions in accordance with at least one embodiment of the invention address this problem, as well as challenges associated with composite devices, replaceable parts (and their own associated ID's), and the possibility of the division and aggregation (or re-aggregation) of parts). An allocation mechanism, as broadly contemplated herein, also affords a level of flexibility that readily accommodates changes in identities.

In an identification scheme according to at least one embodiment of the invention, objects (physical and/or logical entities) can be understood as being uniquely identifiable by a set of attributes, wherein "attribute" is a category in which an object can be classified (e.g., "color"). A value assigns an object's classification within a category, e.g., "red" within "color". Thereupon, an attribute and its corresponding value form an "av-pair", or a key-value pair which characterizes an object (thus, e.g., "color-red").

In accordance with at least one embodiment of the invention, unique identification of an object comes about from applying a functional transformation to result in an aggregate or encompassing identifier (here throughout referred to as a logical identifier) on a set of av-pairs that describe the properties of an object. More particularly, a method (GenID) in accordance with at least one embodiment of the invention undergoes several stages culmination in the generation of a logical identifier, in a manner now to be described in more detail.

In accordance with at least one embodiment of the invention, and as shown schematically in FIG. 1, an ID generator 102 (for effecting a GenID solution) involves three steps for identifying objects via their attributes: filtering 104, classifying into clusters 106 and generating logical identifiers 108. Particularly, attributes are filtered (104) based on their entropy values, such that the most useful set of av-pairs from the all attribute-value pairs of an object are extracted for use in ID generation. Thence, objects are identified at a class level using incremental, real-time, categorical clustering algorithms (106). Finally, in generating logical identifiers (108), ID's are generated for objects based on system version, agency specific information, ftribute-value set and class level information.

In accordance with at least one embodiment of the invention, the filtering step 104 involves eliminating unimportant and unnecessary attributes. This is based on the entropy [1] of attributes and requirements of the attribute, wherein entropy can be defined as the measure of uncertainty or structuredness of the attribute (for background purposes see, e.g., C. E. Shannon, "A mathematical theory of communication", Bell Labs Technical Journal, 1948; http://cm.bell-labs.com/cm/ms/what/shannonday/shannon1948.pdf.)

First, let $P=\{p_{a_{i1}}, p_{a_{i2}}, \ldots p_{a_{iK}}\}$ be the set of probabilities of existence of K possible values of attribute $a_i$. Then the entropy of attribute $a_i$ denoted as $H(a_i)$ is defined as $$H(a_i) = -\sum_{j}^{K} p_{a_{ij}} \ln p_{a_{ij}}, A = \{a_1, a_2, \ldots, a_N\}$$

is the universal set of N attributes devices can specify. It can be assumed that A is known. When the value set of the attribute $a_i$ is continuous with probability density function $f(a_i)$, entropy can be defined as $.H(a_i)=-\int_0^\infty f(a_i) \ln f(a_i) da_i$.

Continuing, in accordance with at least one embodiment of the invention, in the context of databases and information retrieval theory, it can be stated that an attribute with larger value domain normally divides the database into smaller classes and may have a large entropy value. A lower entropy value indicates the attribute divides database into few larger classes, while an attribute with an intermediate entropy value can generally be regarded as useful. Therefore, two threshold values are defined, low threshold (LB) and upper threshold (UB). Those attributes with an entropy value less than LB and those with an entropy value greater than UB can accordingly be discarded.

In accordance with at least one embodiment of the invention, there may be cases when entropy of an attribute is not in an acceptable range, but there may be a requirement to include (or not include) them in a follow-up procedure of ID generation. This may happen, for example, when a new device enters into the market or some existing device is modified to the extent that a new attribute starts qualifying it. There may be other situations when privacy and security requirement of an attribute compels it to exclude the attribute in ID generation process these can be noted as system-specific requirements R. Accordingly, $H=\{H_{(a_1)}, H_{(a2)}, \ldots, H_{(a_N)}\}$ denotes the set of entropies of all attributes, and $F_A$ is the set of filtered av-pairs. With this in mind, FIG. 2 shows a filtering algorithm 204a that can be employed.

In accordance with at least one embodiment of the invention, and returning to FIG. 1, clustering step 106 involves partitioning devices into classes (or clusters) such that those devices belonging to the same cluster are similar in at least some ways, and those belonging to different clusters are dissimilar in at least some ways. As such, devices are clustered based on their av-pairs, and on two levels (or in two distinct senses), wherein "Level 0" clustering is based on the attributes of devices and "Level 1" clustering is based on the av-pairs characterizing devices.

Thence, in accordance with at least one embodiment of the invention, the step of ID generation (or generating a logical identifier) 108 involves a few sub-segments. Accordingly, FIG. 3 depicts a generated ID 310 with several constituent components or fields. (It should be understood that, generally, the ID 310 may include numbers or letters or a combination of both.) First, a "version" field 312 identifies the version number of the ID generation system. Thence, a segment of agencies-specific information 314 is generated from a GenID management hierarchy, whereby local level identifiers are able to serve as global level identifiers. More particularly, referring to FIG. 4, a global, regional and local agency hierarchy is broadly contemplated wherein such information can be incorporated and hence be included as part of the ID. As shown in FIG. 4, a global ID manager 420 is in communication with m constituent regional ID managers 422, any or all of which can be in communication with n constituent local ID managers 424. Generally, it can be appreciated that this type of hierarchy may be applicable to a globally managed network.

Returning to FIG. 3, in accordance with at least one embodiment of the invention, ID 310 includes a segment of class level identification 316, which in turn involves the cluster ID as described here above. Through class level identification information, it is possible to identify the group to which a device belongs, and two parts are included, as touched on hereinabove: Level 0 Cluster ID 316a and Level 1 Cluster ID 316b. The final segment of ID 310 is one of av-pairs based encrypted information 318, generated in three steps. First, in a first step of attribute encoding, given a universal attribute set A and corresponding set of attribute weights W, the attributes in A are ordered in accordance with weights W and each attribute is encoded using Huffmann encoding (see, e.g., D. A. Huffman, "A Method for the Construction of Minimum-Redundancy Codes", Proceedings of the I.R.E., September 1952, pp 1098-1102) where weights play the role of frequencies. With respect to an object, certain attributes are chosen, pseudo-randomly, explicitly, with corresponding values chosen implicitly. Then, in a second step of key generation, encodings of the chosen attributes are used as seeds to form a 128 bit key of the object and, in encryption, the value of the randomly chosen attributes for the object are then encrypted using the keys. At that point, in the third and final step, the 128-bit key generated for the object in the second step is used to encrypt the GenID using an AES (Advanced Encryption Standard) encryption scheme (for background purposes see, e.g., Joan Daemen, Vincent Rijmen, "The Design of Rijndael: AES—The Advanced Encryption Standard." Springer, 2002).

FIG. 5 schematically illustrates a general system architecture, including an Identity Management System (IMS) 524, in accordance with at least one embodiment of the invention. Included is an ID generator module 502 which can generate a logical identifier ID as described heretofore. This is in communication with an ID cache 530 and objects database 532. A destroyer module 526, on the other hand, is configured to destroy or erase the ID of an object upon deregistration of the object while an updater module 528 can update the ID or metadata associated with an object. These components and steps will be better understood in accordance with the discussion herebelow.

Thus, accordance with at least one embodiment of the invention, objects 534 can register (536) to IMS 524 in an initial step before receiving an ID. During registration 536, then, objects 534 can specify av-pairs and metadata about themselves such as protocols understood, services deployed, etc. Generator 502 generates a unique logical ID (e.g., in a manner as described hereinabove), which in a response step of registration 536 is returned to the corresponding object 534. Additionally, an entry is allotted in the ID cache 530 pointing to a record of the object 524 in database 532.

In accordance with at least one embodiment of the invention, objects 534 can then, at any point, deregister (538) from the IMS 524 and/or have their metadata updated (540). Each of these steps (538/540) is two-way in nature, involving request to the IMS 524 and confirmation therefrom. In updating (540), the object sends a request to update its records, using its allocated unique ID to gain access to IMS 524 The updater module 528 then finds the corresponding entry in the ID cache 530 and retrieves the pointer to database 532, thereafter updating records in either or both of the cache and database (530/532) as needed (e.g., using a suitable data exchange protocol). In deregistration (538), once an object 534 requests for deregistration and gains access to IMS 524 via its unique ID, deregistration module 526 finds the corresponding in the ID cache 530, retrieves the pointer to database 532, and deletes both the object record from database 532 and the corresponding entry from ID cache 530.

Figure 6:
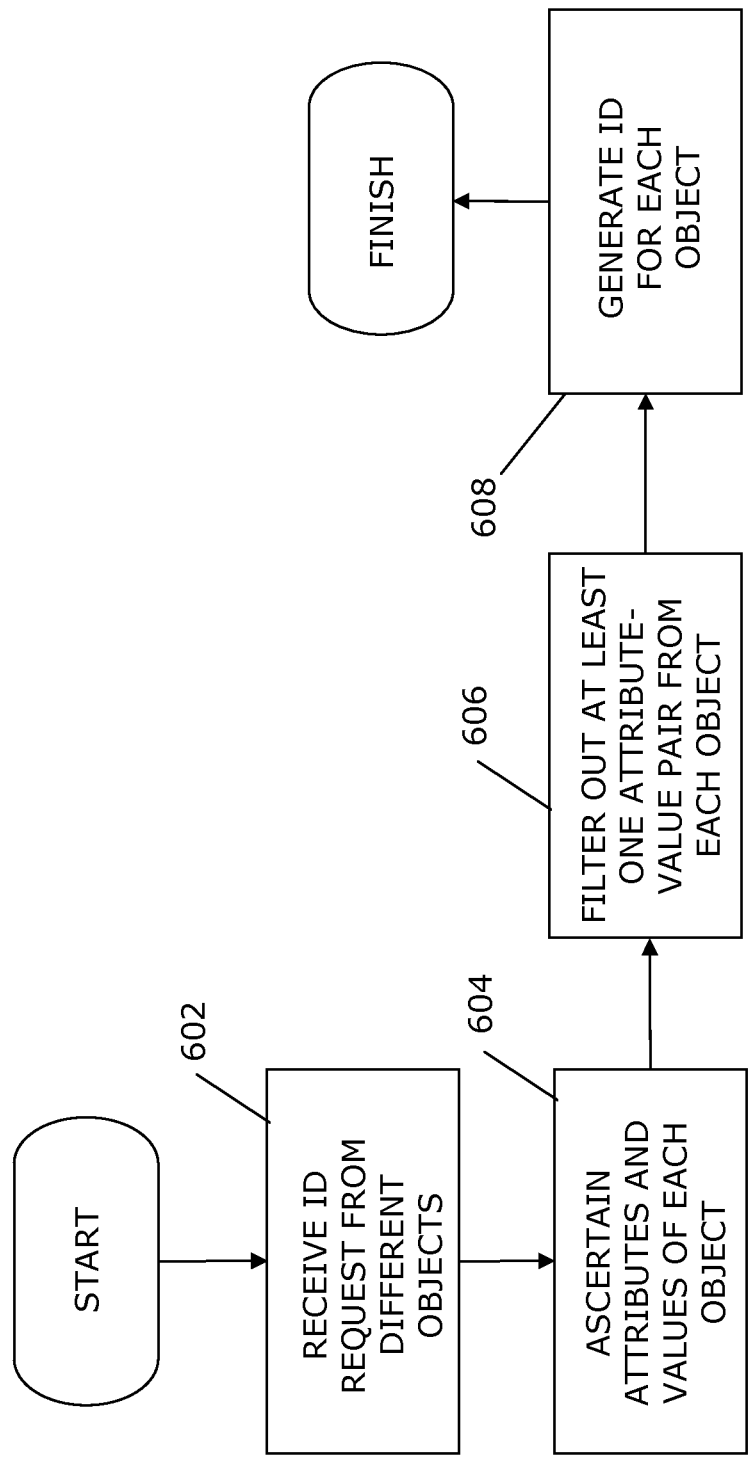
FIG. 6 sets forth a process more generally for object identification.

FIG. 6 sets forth a process more generally for object identification, in accordance with at least one embodiment of the invention. It should be appreciated that a process such as that broadly illustrated in FIG. 6 can be carried out on essentially any suitable computer system or set of computer systems, which may, by way of an illustrative and on-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

As shown in FIG. 6, an identification request is received from different objects of a network (602). Attributes and values of each object are ascertained (604), and at least one attribute-value pair from each object is filtered out (606). An ID is generated for each object based on at least one remaining attribute-value pair from the filtering (608).

Figure 7:
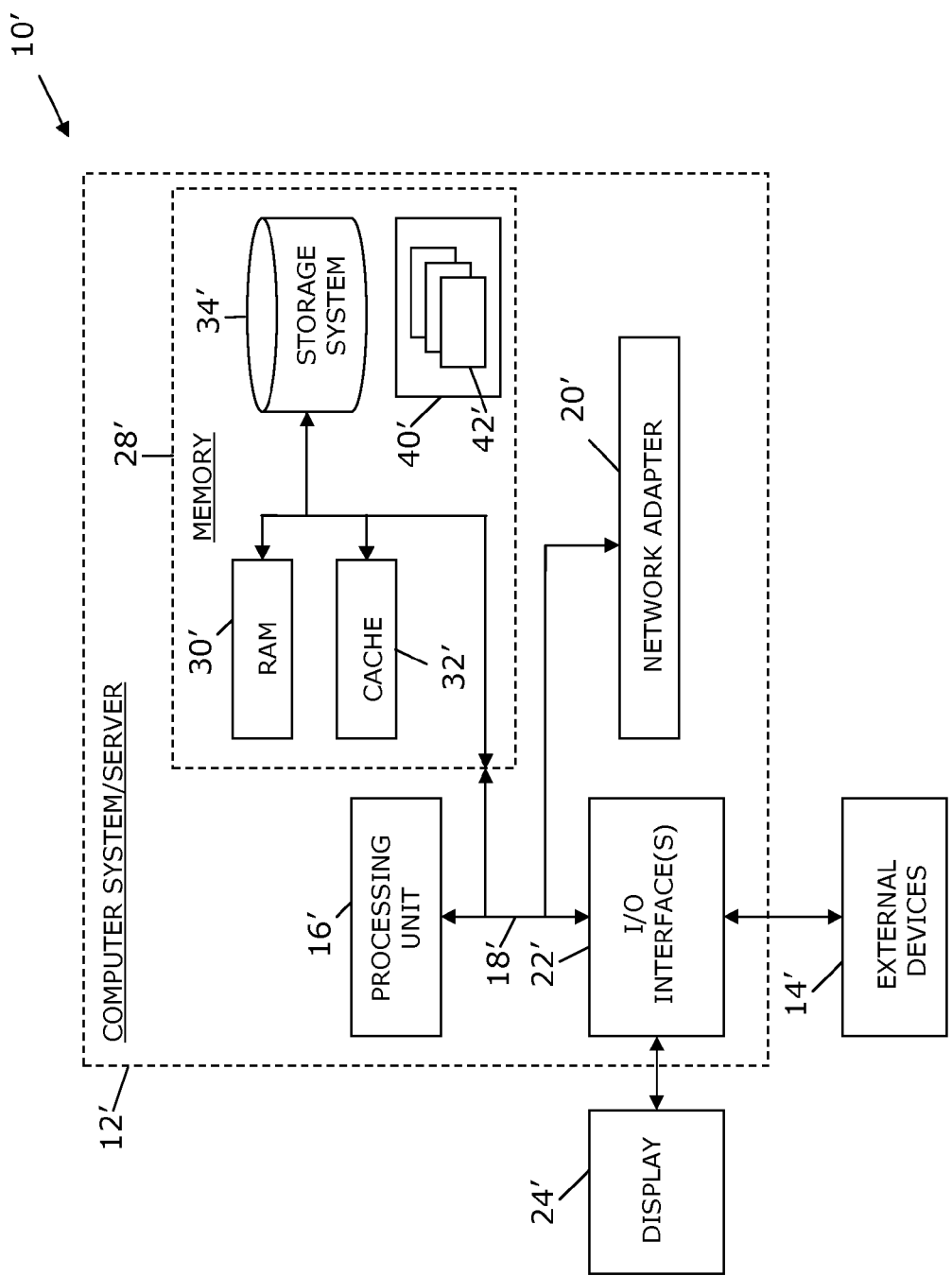
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   Receiving an identifying request from different objects of a network;
   Ascertaining attributes and values of each object;
   Filtering out at least one attribute-value pair from each object; and
   Generating ID for each object based on at least one remaining attribute-value pair from said filtering;
   Wherein said filtering comprises ascertaining attribute entropy and attribute requirements; and
   Wherein said filtering further comprises accepting attribute-value pairs with attribute entropy between predetermined upper and lower entropy bounds.

2. The method of according to claim 1, wherein the objects are associated with an internet of things.

3. The method according to claim 1, further comprising clustering objects based on filtered attribute-value pairs.

4. The method according to claim 3, wherein said clustering combines clustering on two levels.

5. The method according to claim 4, wherein one of the tow levels relates to attributes of objects.

6. The method according to claim 5, wherein the other of the two levels relates to attribute-value pairs of objects.

7. The method according to claim 1, wherein said filtering comprises relevance-based filtering.

8. The method according to claim 1, wherein said filtering further comprises selectively accepting attribute-value pairs with attribute entropy outside of the predetermined upper and lower entropy bounds.

9. The method according to claim 1, wherein said generating comprises generating an ID with one or more fields taken from the group consisting of: Version; agency-specific information; class-level identification; attribute-value pair based on encrypted information.

10. The method according to claim 1, comprising: with respect to an identify management system, at least one step taken from the group consisting of: registering an object; updating object data; deregistering an object.

11. An apparatus comprising:

At least one processor; and

A non-transitory computer readable storage medium having computer readable program code embodied therewith and executable by the at least one processor, the computer readable program code comprising:

Computer readable program code configured to receive an identification request from different objects of a network;

Computer readable program code configured to ascertain attributes and values of each object;

Computer readable program code configured to filter out at least one attribute-value pair from each object; and Computer readable program code configured to generate an ID for each object based on at least one remaining attribute-value pair from the filtering;

Wherein said computer readable program code is configured to ascertain attribute entropy and attribute requirements; and Wherein said computer readable medium program code configured to accept attribute-value pairs with attribute entropy between predetermined upper and lower entropy bounds.

12. A computer program product comprising:

A non-transitory computer readable storage medium having computer readable program code embodied therewith, the computer readable program code comprising:

Computer readable program code configured to receive an identification request from different objects of a network;

Computer readable program code configured to ascertain attributes and values of each object;

Computer readable program code configured to filter out at least one attribute-value pair from each object; and Computer readable program code configured to generate an ID for each object based on at least one remaining attribute-value pair from the filtering;

Wherein said computer readable program code is configured to ascertain attribute entropy and attribute requirements; and Wherein said computer readable program code is configured to accept attribute-value pairs with attribute entropy between predetermined upper and lower entropy bounds.

13. The computer program product according to claim 12, wherein the objects are associated with an internet of things.

14. The computer program product according to claim 12, wherein said computer readable program code is further configured to cluster objects based on filtered attribute-value pairs.

15. The computer program product according to claim 14, wherein said computer readable program code is further configured to cluster objects based on filtered attribute-value pairs.

16. The computer program product according to claim 15, wherein said computer readable program code is further configured to cluster on two levels.

17. The computer program product according to claim 16, wherein the other of the tow level relates to attribute-value pairs of objects.

18. The computer program product according to claim 12, wherein said computer readable program code is configured to ascertain attribute entropy and attribute requirements.

19. The computer program product according to claim 12, wherein said computer readable program code is further configured to attribute-value pairs with attribute entropy outside of the predetermined upper and lower entropy bounds.

20. The computer program product according to claim 12, wherein said computer readable program code is configured to generate an ID with one or more fields taken from the group consisting of: version, agency-specific information; class-level identification; attribute-value pair based encrypted information.

21. The computer program product according to claim 12, wherein said computer readable program code is configured, with respect to an identity management system, to perform at least one step taken from the group consisting of: registering an object, updating object data; deregistering an object.

* * * * *